United States Patent
Griffin

(10) Patent No.: US 10,257,241 B2
(45) Date of Patent: Apr. 9, 2019

(54) MULTIMODAL STREAM PROCESSING-BASED COGNITIVE COLLABORATION SYSTEM

(71) Applicant: Cisco Technology, Inc., San Jose, CA (US)

(72) Inventor: Keith Griffin, Co. Galway (IE)

(73) Assignee: Cisco Technology, Inc., San Jose, CA (US)

(*) Notice: Subject to any disclaimer, the term of this patent is extended or adjusted under 35 U.S.C. 154(b) by 280 days.

(21) Appl. No.: 15/386,857

(22) Filed: Dec. 21, 2016

(65) Prior Publication Data

US 2018/0176269 A1    Jun. 21, 2018

(51) Int. Cl.
    *H04L 29/06*            (2006.01)
    *H04L 29/08*            (2006.01)
    *G10L 15/26*            (2006.01)

(52) U.S. Cl.
CPC .......... *H04L 65/403* (2013.01); *H04L 65/607* (2013.01); *H04L 67/02* (2013.01); *G10L 15/26* (2013.01)

(58) Field of Classification Search
CPC ... H04L 67/1097; H04L 65/403; H04L 67/02; G06F 15/16; G06F 17/30516; G06F 17/30893
USPC ...................................... 709/204; 706/18, 46
See application file for complete search history.

(56) References Cited

U.S. PATENT DOCUMENTS

| | | | | |
|---|---|---|---|---|
| 7,036,128 B1* | 4/2006 | Julia | ...................... | G06F 9/465 707/E17.071 |
| 9,208,153 B1* | 12/2015 | Zaveri | ............... | G06F 17/30867 |
| 2006/0026231 A1 | 2/2006 | Degenhardt et al. | | |
| 2009/0319459 A1* | 12/2009 | Breazeal | ............ | G06K 9/00335 706/46 |
| 2010/0228693 A1* | 9/2010 | Dawson | .............. | G06F 17/2705 706/12 |

(Continued)

OTHER PUBLICATIONS

"Siri", Wikipedia page, https://en.wikipedia.org/w/index.php?title=Siri&printable=yes, downloaded from the internet on Dec. 21, 2016, 10 pages.

(Continued)

*Primary Examiner* — Tesfay Yohannes
(74) *Attorney, Agent, or Firm* — Edell, Shapiro & Finnan, LLC

(57) ABSTRACT

A collaboration system includes a stream processing engine and a Bot subsystem. The stream processing engine performs cognitive processing of multimodal input streams originated at one or more user devices in a communication session supported by a collaboration service to derive user-intent-based user requests and transmit the user requests over one or more networks. The Bot subsystem includes a stream receptor directs the multimodal input streams from the user devices to the stream processing engine to enable the stream processing engine to derive the user requests. The Bot subsystem also includes a cognitive action interpreter to translate the user requests to action requests and issue the action requests to the collaboration service so as to initiate actions with respect to the communication session. The Bot subsystem also includes a cognitive responder to transmit, in response to the user requests, multimodal user responses to the one or more user devices.

20 Claims, 6 Drawing Sheets

(56) References Cited

U.S. PATENT DOCUMENTS

| | | | |
|---|---|---|---|
| 2014/0280186 A1* | 9/2014 | Peters | G06F 17/30613 |
| | | | 707/741 |
| 2014/0324747 A1* | 10/2014 | Crowder | G06N 3/086 |
| | | | 706/18 |
| 2015/0019227 A1* | 1/2015 | Anandarajah | G10L 15/22 |
| | | | 704/257 |
| 2016/0140619 A1* | 5/2016 | Soni | G06Q 30/0269 |
| | | | 705/14.66 |
| 2016/0173578 A1 | 6/2016 | Sharma et al. | |
| 2016/0269508 A1 | 9/2016 | Sharma et al. | |
| 2017/0255701 A1* | 9/2017 | Pratt | G06F 17/30867 |
| 2017/0355080 A1* | 12/2017 | Podnar | B25J 5/00 |
| 2018/0308574 A1* | 10/2018 | Proctor Beauchamp | |
| | | | G06F 19/34 |

OTHER PUBLICATIONS

"Amazon Echo" Wikipedia page, https://en.wikipedia.org/w/index.php?title=Amazon_Echo&printable=yes, downloaded from the internet on Dec. 21, 2016, 8 pages.

"Cortana (software)", Wikipedia page, https://en.wikipedia.org/w/index.php?title=Cortana_(software)&printabl . . . , downloaded from the internet on Dec. 21, 2016, 8 pages.

"Google Now", Wikipedia page, https://en.wikipedia.org/w/index.php?title=Google_Now&printable=yes, downloaded from the internet on Dec. 21, 2016, 5 pages.

\* cited by examiner

US 10,257,241 B2

MULTIMODAL STREAM PROCESSING-BASED COGNITIVE COLLABORATION SYSTEM

TECHNICAL FIELD

The present disclosure relates to cognitive collaborative.

BACKGROUND

Cognitive collaboration involves cognitive processing applications to enable users to control collaboration applications/services on behalf of, and in a way that is natural to, humans. The cognitive processing applications receive user generated input, such as voice, video, or text, and convert that input into actions that interact with web-based and services that are not web-based on behalf of the users. Conventional cognitive processing applications are limited in several ways. First, cognitive processing applications limit the types of input a user may provide to text only, or voice only. Second, the cognitive processing applications are unable to concurrently process multimodal input, e.g., voice, text, and video, associated with a given user to produce a decision as to user intent. Third, the cognitive processing applications include cognitive processing functions that are tightly bound to each other and therefore inflexible. Inflexible cognitive processing functions do not scale easily and are not readily accessible from many geographical locations.

DESCRIPTION OF EXAMPLE EMBODIMENTS

Overview

A system comprises a stream processing engine and a Bot subsystem. The stream processing engine includes a plurality of processor modules configured to perform cognitive processing of multimodal input streams including input audio, input video, and input text, originated at one or more user devices associated with a communication session supported by a collaboration service to derive user-intent-based user requests associated with the communication session and transmit the user requests over one or more networks. The Bot subsystem is configured to communicate with the stream processing engine, the collaboration service, and the one or more user devices over the one or more networks. The Bot subsystem includes a collection of Bots. The Bots are configured to implement a stream receptor to receive the multimodal input streams from the one or more user devices and direct the multimodal input streams to one or more of the plurality of processor modules of the stream processing engine to enable the stream processing engine to derive the user requests. The Bots also implement a cognitive action interpreter to translate the user requests to corresponding action requests and issue the action requests to the collaboration service so as to initiate actions with respect to the communication session. The Bots also implement a cognitive responder to transmit, in response to the user requests, multimodal user responses, including audio, video, and text user responses to the one or more user devices.

Example Embodiment

Embodiments presented herein are directed to cognitive collaboration. As used herein, the term "cognitive collaboration" refers to the use of a cognitive collaboration system to enable users to interface with and control collaboration applications/services on behalf of, and in a way that is natural to, humans. The cognitive collaboration system uses cognitive processing to convert multimodal content streams (which may be concurrent or non-concurrent) including voice/speech, images/video, and text from, or associated with, the users to human-like, cognitive actions to be applied to the collaboration services that are of interest to the users. More specifically, the cognitive processing uses cognitive processes, including, but not limited to, speech recognition, video object/face recognition, natural language processing, artificial intelligence, and knowledge databases and knowledge graphs containing information related to collaboration services, to derive user intent from the multimodal content streams. Then, the cognitive collaboration system converts the user intent to cognitive actions to be applied to the appropriate collaboration services and multimodal content responses or feedback to the users. Cognitive collaboration that involves multimodal content stream processing is referred to as "multimodal stream processing-based cognitive collaboration."

Figure 1:
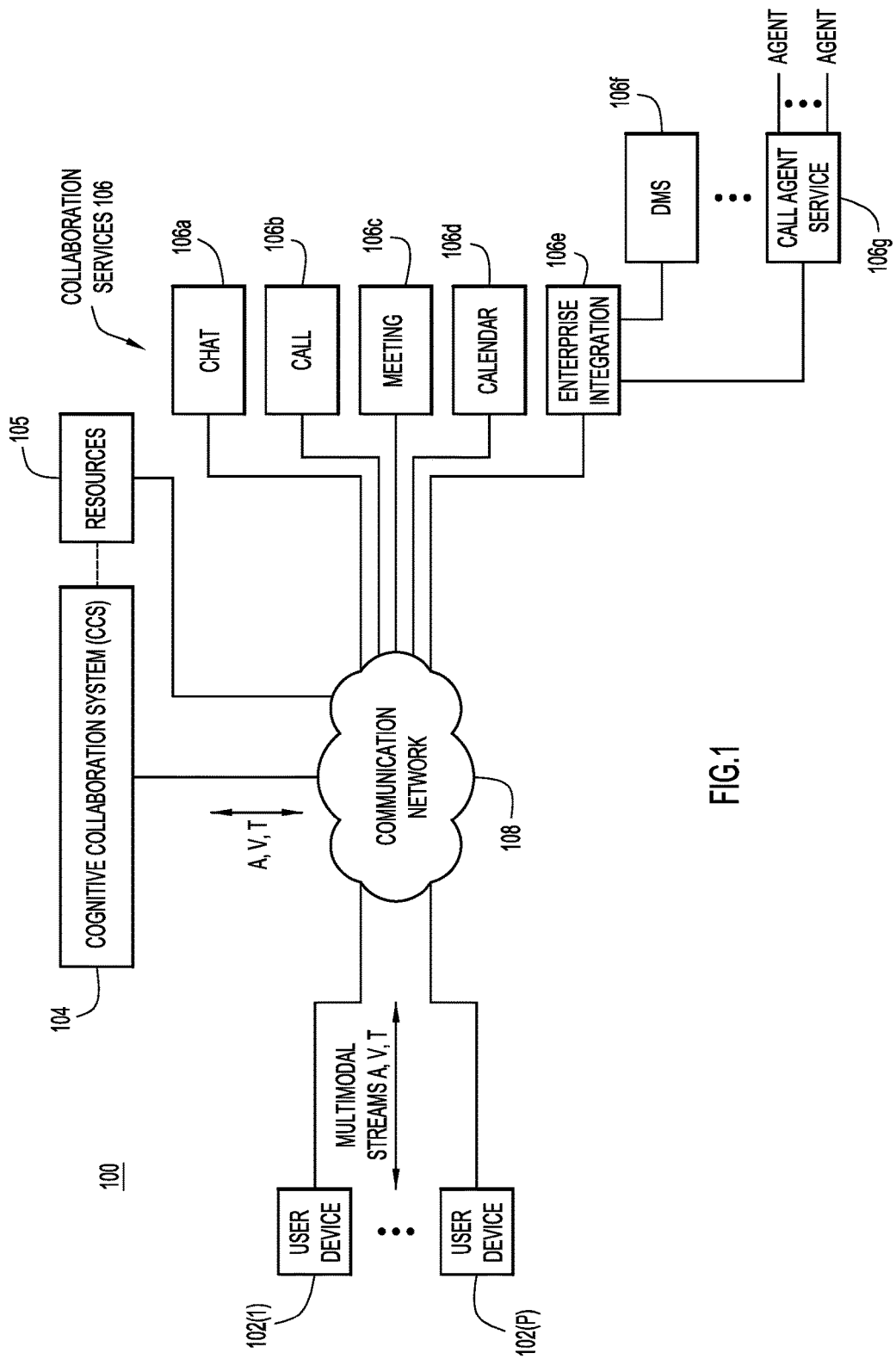
FIG. 1 is a block diagram of a network environment in which embodiments directed to multimodal stream processing-based cognitive collaboration may be implemented, according to an example embodiment.

With reference to FIG. 1, a diagram is shown of an example network environment 100 in which embodiments directed to multimodal stream processing-based cognitive collaboration may be implemented. Environment 100 includes multiple user devices 102(1)-102(P) (collectively referred to as "user devices 102") operated by respective users (not shown in FIG. 1), a cognitive collaboration system (CCS) 104 that interfaces with resources 105 and operates in accordance with embodiments presented herein, a variety of collaboration services 106, and a communication network 108 over which the user devices, and the collaboration services communicate. Collaboration services 106 may be implemented as application programs hosted on one or more servers (not shown in FIG. 1), and include a chat service 106a, a call service 106b, a meeting service 106c, a calendar service 106d, and a corporate or enterprise service 106e, which may include a document service 106f and a call agent service 106g, for example. Communication network 106 may include one or more wired or wireless local area networks (LANs) and one or more wired or wireless wide area network (WANs), including the Internet and the Public Switched Telephone Network (PSTN). CCS 104 and collaboration services 106 may each be implemented as one or more computer applications hosted on one or more computer servers, which may be distributed across many geographically separated sites. Also, various ones of collaboration services 106 shown separately in FIG. 1 may be integrated together/combined into a single service.

Chat service 106a hosts instant messaging (IM, Business Messaging, or chat) applications that user devices 102 may invoke to enable users of the user devices to engage in chat sessions or enter chat rooms with each other. CCS 104 communicates, and shares information, with chat service 106a to provide the users of user devices 102 with convenient access to communication sessions managed by the chat service. Chat service 106a may be one service or application that is part of a broader collaboration service from which users can engage in chat sessions, initiate voice calls, initiate video calls, upload documents to a shared workspace, and initiate web-based meetings. Thus, chat service 106a may be integrated or combined with call service 106b and meeting service 106c to form a collaboration service.

Call service 106b and meeting service 106c are examples of respective communication services that support/manage respective communication sessions to which one or more of user devices 102 connect to communicate with each other. Call service 106b supports/manages communication sessions as "calls" between various ones of user devices 102 connected to the call service over communication network 108. The calls include, but are not limited to, voice-only calls, multimedia (voice, audio, image, and data) calls, voice-over-Internet Protocol (IP) calls, and so on. CCS 104 communicates, and shares information, with call service 106b to provide the users of user devices 102 with convenient access to communication sessions managed by the call service.

Meeting service 106c supports/manages communication sessions as web-based meetings between various ones of user devices 102 connected to the meeting service over communication network 108. In general, a web-based meeting (also referred to as an "online" meeting) is a meeting that is conducted over the Internet, for example, and managed by meeting service 106c that presents web-pages to each user device connected to the same meeting to mimic a collaborative environment in which users can converse in audio, video and electronically share documents and other data in real-time. Web-based meetings may include personal meeting rooms, collaboration meeting rooms, and so on. CCS 104 communicates, and shares information, with meeting service 106c to provide the users of user devices 102 with convenient access to communication sessions managed by the meeting service.

Calendar service 106d interacts with user devices 102 to enable users of the user devices to schedule calls and web-based meetings with each other, and the calendar service generates scheduling information for all such scheduled communication sessions. Calendar service 106d may have access to scheduled communication sessions and, for each scheduled communication session, scheduling information including, identities of participants invited to the session, and start and stop times of the session. CCS 104 may access the scheduling information and store it in databases of resources 105 (hosted on networked support servers, not shown) in association with other information accessed from call service 106b and meeting service 106c.

Enterprise integration service 106e provides a corporate or enterprise-based communication interface through which user devices 102 access enterprise resources, such as a document management system (DMS) 106f or a call agent service 106g.

User devices 102 may each take on a variety of forms, including a landline telephone, SmartPhone, tablet, laptop computer, desktop computer, video conference endpoint, and the like. User devices 102 may each host a call application used to make calls from the user device, a calendar application, and a web-based conference client application that communicates with the calendar application. Users of user devices 102 may use the calendar applications to schedule communication sessions into a user calendar at a date and time in the future. Calendar service 106d may interact with the calendar applications of user devices 102 to access communication session information stored by the calendar applications, and then compile that information into communication session records accessible to CSS 106.

User devices 102 are configured to generate concurrent multimodal content streams including audio (A), video (V), and text (T) associated with users local to the user devices, and transmit the concurrent multimodal content streams to CCS 104 and collaboration services 106 over communication network 108. To this end, user devices 102 are each configured with destination addresses, e.g., IP addresses, in CCS 104 to which the multimodal content streams are to be transmitted. At any given time, the multimodal content streams may include concurrent audio, video, and text streams, or may include only one of the multimodal content streams. User devices 102 are also configured to receive concurrent multimodal content streams, including audio, video, and text from CCS 104 and present the received audio, video, and text to the local users. User devices 102 are each configured with destination information for CCS 104, e.g., one or more network destination addresses of the CCS, which enables the user devices to transmit their respective multimodal content streams to the CCS.

In accordance with embodiments presented herein, CCS 104 enables users of devices 102 to interface with and control collaboration services 106 on behalf of, and in a way that is natural to, the users. More specifically, CCS 104 receives the concurrent multimodal content streams transmitted from user devices 102 over network 108, performs concurrent cognitive processing on the concurrent multimodal content streams to derive user intent from the multimodal content streams, and converts the user intent to cognitive actions. CCS 104 applies the cognitive actions to appropriate ones of collaboration services 106 over network 108 to control communication sessions supported by the collaboration services. Depending on the derived user intent, CCS 104 also provides concurrent multimodal content responses/feedback, including audio, video, and text responses/feedback to the user devices over network 108.

Figure 2:
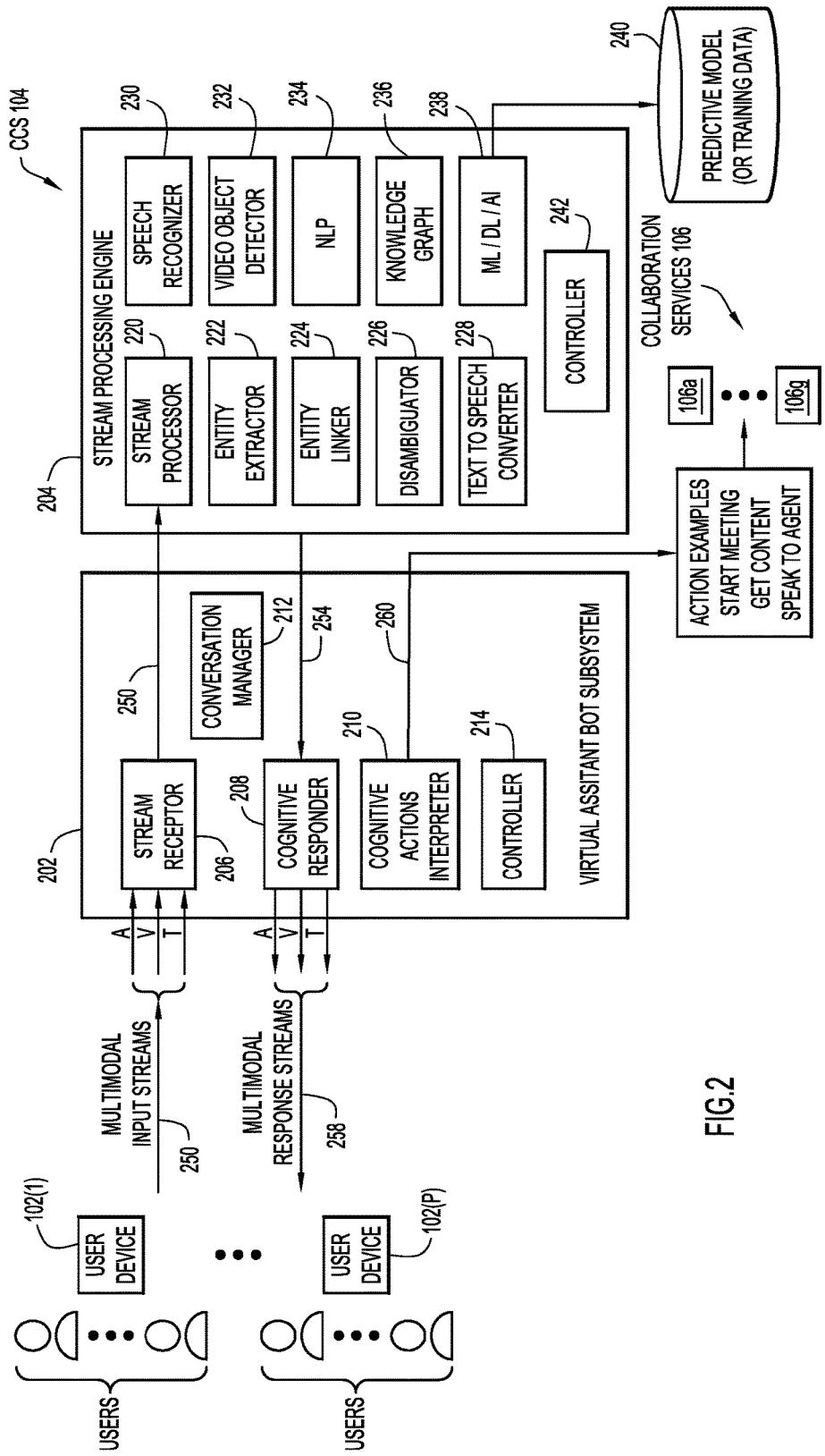
FIG. 2 is a block diagram of a cognitive collaboration system as deployed in the network environment, according to an example embodiment.

With reference to FIG. 2, there is a block diagram of CCS 104 as deployed in network environment 100. CCS 104 includes a virtual assistant Bot subsystem 202 (also referred to more simply as "Bot subsystem 202") and a stream processing engine (SPE) 204 that communicate with each other over network 108. Bot subsystem 202 communicates with user devices 202, stream processing engine 204, and collaboration services 106. Stream processing engine 204 communicates primarily with Bot subsystem 202.

Bot subsystem 202 includes a plurality of Bots, which may be hosted on one or more networked servers (not shown in FIG. 2). Each Bot, also known as World Wide Web (WWW) robot, may include a computer program or application that runs automated tasks (scripts) over communication network 108, such as the Internet. The Bots perform structurally repetitive tasks on behalf of users associated with user devices 102 at a much higher rate than would be possible for a human alone, and also support cognitive processing in stream processing engine 204. The Bots include a stream receptor 206, a cognitive responder 208, a cognitive action interpreter 210, a conversation manager 212, and an overall Bot controller 214. Bot subsystem 204 may include many instances of each of the aforementioned Bots to handle concurrent processing of many multimodal content input streams (referred to simply as "multimodal input streams") and concurrent processing of many multimodal response streams (referred to simply as "multimodal response streams").

In Bot subsystem 202, stream receptor 206 receives or ingests multimodal input streams 250 including audio, video, and text transmitted from user devices 102 over network 108. Multimodal input streams 250 may be received concurrently or one at a time. In either case, stream receptor 204 transmits multimodal input streams 250 received from user devices 102 to stream processing engine 204. To this end, stream receptor 206 may be configured with one or more destination addresses, e.g., IP addresses, of destinations for multimodal input streams 250 in stream processing engine 204. In an example, stream receptor 206 may stream the audio and video from each of user devices 102 to stream processing engine 204 over individual concurrent network connections between the stream receptor and the stream processing engine using the Real-time Transport Protocol (RTP).

Stream processing engine 204 performs cognitive processing on multimodal input streams 250 from stream receptor 204 to derive user intent, generates user-intent-based requests/commands 254 (also referred to more simply as "user requests 254") representative of the user intent, and transmits the user requests/commands to Bot subsystem 202. To this end, stream processing engine 202 may be configured with destination addresses, e.g., IP addresses, in Bot subsystem 202 to which user requests 254 are to be transmitted. User requests 254 represent corresponding user intents bundled into corresponding network messages to be transmitted over network 108.

User requests 254 may be categorized as responses (e.g., feedback) to user devices 102, cognitive actions that need to be taken with respect to collaboration services 106, or both. In response to user requests categorized as responses, cognitive responder 208 generates multimodal response streams 258 including audio, video, and text streams as directed by the commands/responses, and provides the response streams to user devices 102. To this end, cognitive responder 208 may include a text-to-speech module (not shown in FIG. 2) to convert text/messages to voice commands to be transmitted in multimodal response streams 258. Cognitive responder 208 is configured with network destination addresses, e.g., IP addresses, of user devices 102 to which multimodal response streams 258 are to be transmitted.

In response to user requests categorized as cognitive actions, cognitive action interpreter 210 generates commands/instructions 260 (also referred to as "action requests 260") to control collaboration services 206 as directed by the user requests. To this end, cognitive action interpreter 210 is configured with network destination addresses, e.g., IP addresses, of collaboration services 206 to which action requests 260 are to be transmitted. Examples of such action requests include commands to collaboration services 106 that are formatted to achieve any of the following: "retrieve document from document management system"; "start online meeting"; "end online meeting"; "connect user to call agent"; and "schedule online meeting using calendar." Such action requests generated by cognitive action interpreter 210 in the context of CCS 104 may result without a user having to utter a voice command or enter a text command.

Bot subsystem 202 also includes conversation manager 212 to manage/handle voice conversations between users associated with user devices 102 and CCS 104. When processing input audio streams, stream processing engine 204 and cognitive responder 208 may cooperate to convert voice requests uttered by users of user devices 102 and conveyed in the input audio streams (250) to voice responses conveyed in audio response streams (258). Conversation manager 212 determines one or more contextual conversation sequences associated with different sequences of voice requests and voice responses. The contextual conversation sequences may represent specific communication sessions supported by one of collaboration services 104, and may identify various user devices engaged in the communication sessions. Conversation manager 212 classifies as a contextual conversation sequence a sequence of the voice requests and the voice responses associated with a (same) conversation context, and ensures, for example, that voice responses are sent to the user device(s) associated with the correct conversation context.

Stream processing engine 204 includes one or more networked servers to host cognitive processing modules that receive multimodal input streams 250 from stream receptor 206 and collectively perform cognitive processing of the multimodal input streams to derive the above-mentioned user intent and corresponding user requests 254 to be sent to Bot subsystem 202. The cognitive processing modules include, but are not limited to, a stream processor 220 to receive multimodal input streams 250 and direct their respective content (i.e., audio/speech, video, and text) to appropriate ones of other cognitive processing modules for processing, an entity extractor 222, an entity linker 224 to link together similar entities recognized by the entity extractor, a disambiguator 226, a text-to-speech converter 228 (which may also and/or alternatively be implemented in cognitive responder 208), a speech recognizer 230 (e.g., a speech-to-text converter) to convert speech to text, a video object detector 232 (e.g., a face detector) to detect objects in images and video, a natural language processor (NLP) 234 that derives user intent from text, a knowledge graph module 236, a machine learning (ML)/deep learning (DL)/artificial intelligence (AI) module 238 that interacts with a predictive model module 240, and a stream processing engine controller 242 to provide overall control of stream processing engine 204. Stream processing engine 204 may include many instances of each of the aforementioned cognitive processing modules to support concurrent processing of many multimodal input streams 250.

Stream processing engine 204 organizes and interconnects various ones of the cognitive processing modules into collections of cognitive processing modules that process multimodal input streams 250 according to the type of input stream (i.e., audio, video, or text), as follows. Stream processor 220 may terminate RTP media connections originated at stream receptor 206 of Bot subsystem 202. When stream processor 220 receives text, the stream processor directs the text to NLP 234, which derives user intent from the text. When stream processor 220 receives audio, the stream processor directs the audio to speech recognizer 230, which converts speech in the audio to text. In turn, speech recognizer 230 directs the converted text to NLP 234, which again derives user intent from the converted text. When stream processor 220 receives images/video, the stream processor directs the images/video to video object detector 232. Video object detector 232 detects human faces from the images/video and may also recover user identification information associated with the detected faces, as described below.

Under some circumstances, user intent initially derived by NLP 234 may be relatively complete and unambiguous. For example, NLP 234 may break a complete text sentence into a set of classified intents. In such circumstances, stream processing engine 204 may use such user intent directly as a corresponding one of user requests 254. In contrast, the user intent as initially derived may be relatively incomplete and ambiguous, and thus unsuitable for direct use as one of user requests 254. That is, the user intent may require further enrichment, resolution, and/or disambiguation. In such cases, the user intent may be provided to one or more of entity extractor 222, knowledge graph module 236, entity linker 224, and disambiguator 226 for the further enrichment, resolution, and/or disambiguation. Also, the user intent may be combined with the user identification information associated with the detected faces.

Entity extractor 222 accesses information associated with a communication session supported by one of collaboration services 106 to which the user intent has been determined to pertain. For example, entity extractor 222 may extract from calendar service 106d information for an online meeting supported by meeting service 106c, such as a meeting start time, a meeting stop time, meeting invitees, and a meeting uniform resource locator (URL). Then, stream processing engine 204 may derive a user request based on the user intent and the information accessed by the entity extractor. In another example to resolve user intent, knowledge graph module 236 accesses a variety of knowledge databases, based on the user intent and information associated with a communication session supported by one of collaboration services 104 to which the user intent has been determined to pertain, to generate a knowledge graph relevant to the user intent. Then, stream processing engine 204 may generate one or more user requests based on the user intent and information in the knowledge graph. In another example in which the user intent implies multiple possible user intents, disambiguator 226 disambiguates the multiple user intents to a single intent, based on information associated with a communication session supported by one of collaboration services 104 to which the user intent has been determined to pertain.

The above-described knowledge graph may be used in conjunction with outputs from disambiguator 226 in order to identify/resolve specific user intent. For example, consider a situation in which cognitive processing (including a knowledge graph and outputs from disambiguator 226) of a particular type of input stream (e.g., audio or text) is unable to derive a user intent or derives a user intent that is ambiguous. In that situation, further information from a user operating one of user devices 102 may be helpful or even necessary. Accordingly, to solicit the further information, stream processing engine 204 may generate and send to cognitive responder 208 a request (e.g., based on the disambiguator outputs and the knowledge graph) that causes the cognitive responder to send to the user device a request for the further information in a form that is understandable to the user operating the user device. Typically, cognitive responder 208 will send the request for the further information as a multimodal response using the same media type/mode as the input stream, although there may be exceptions. For example, if the input stream included voice conveying a voice command from the user, cognitive responder 208 generates the multimodal response as a voice request back to the user for more information.

As mentioned above, stream processor 220 directs video to video object detector 232. In an example, video object detector 232 includes a face detector to detect faces from the video. In addition, video object detector 232 may access a databases of predetermined faces stored in resources 105 to determine whether each detected face is recognized as belonging to an enterprise and, if a face is recognized, i.e., a match is found, video object detector 232 accesses user identification information associated with the recognized face. The user identification information associated with the recognized face indicates the presence of a specific person associated with one of user devices 102 and may be combined with user intent derived from input text and/or input audio to generate further user intent to be conveyed in one or more corresponding user requests 254.

In certain situations, it is preferable to convey user requests 254 to cognitive responder 208 as voice commands to be conveyed to one or more of user devices 102. To this end, text-to-speech converter 228 may be used to convert the user intent to such voice commands, which are then provided to cognitive responder 208. Alternatively, cognitive responder 208 may be equipped with its own text-to-speech converter to perform a similar function.

Stream processing engine 204 includes ML/DL/AI module 238 configured to apply machine learning, deep learning, and artificial intelligence to user intents derived from multimodal input streams 250 so as to adapt existing rules for deriving the user intent and generate new rules over time. ML/DL/AI module 238 may use one or more predictive models provided by predictive model module 240. While ML/DL/AI module 238 is shown as a single module, the capabilities provided by the ML/DL/AI module may be distributed across multiple machine learning, deep learning, and artificial intelligence modules, which collectively represent a processing engine for trained/supervised and unsupervised learning techniques, and which may be implement external to stream processing engine 204.

Figure 3A:
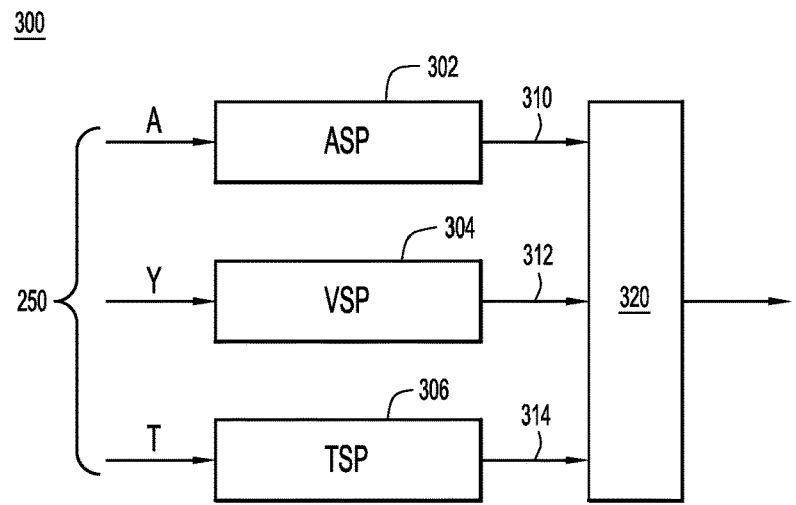
FIG. 3A is a block diagram of an arrangement of cognitive processors in a stream processing engine of the cognitive collaboration system, according to an example embodiment.

With reference to FIG. 3A, there is a block diagram of an example arrangement 300 of cognitive processors in stream processing engine 204. Arrangement 300 includes an audio stream processor 302, a video stream processor 304, and a text stream processor 306 configured to perform concurrent cognitive processing of concurrent multimodal input streams A, V, and T to produce concurrent cognitive processing results 310, 312, and 314, respectively. Audio, video, and text processors 302, 304, and 306 are also configured to perform non-concurrent cognitive processing when multimodal input streams A, V, and T are not themselves concurrent. Cognitive processing results 310 and 314 may include corresponding user intents, while processing results 312 may include detected faces and user identification information associated with the detected faces.

Each of audio, video, and text processors 302, 304, and 306 may include a respective collection of instances of various ones of the cognitive processing modules described above. For example, audio, video, and text processors 302, 304, and 306 may include, at a minimum, instances of (speech recognizer 230 and NLP 234), (video object recognizer 232), and (NLP 234), respectively. Each of audio, video, and text processors 302, 304, and 306 may also incorporate additional ones of the cognitive processing modules as needed to disambiguate and enrich user intent, as described above.

Arrangement 300 includes combining logic 320 to combine processing results 310, 312, and 314 into complete/enriched user intents for user requests 254, using the techniques described above. Thus, combining logic 320 may include cognitive processing modules described above.

Figure 3B:
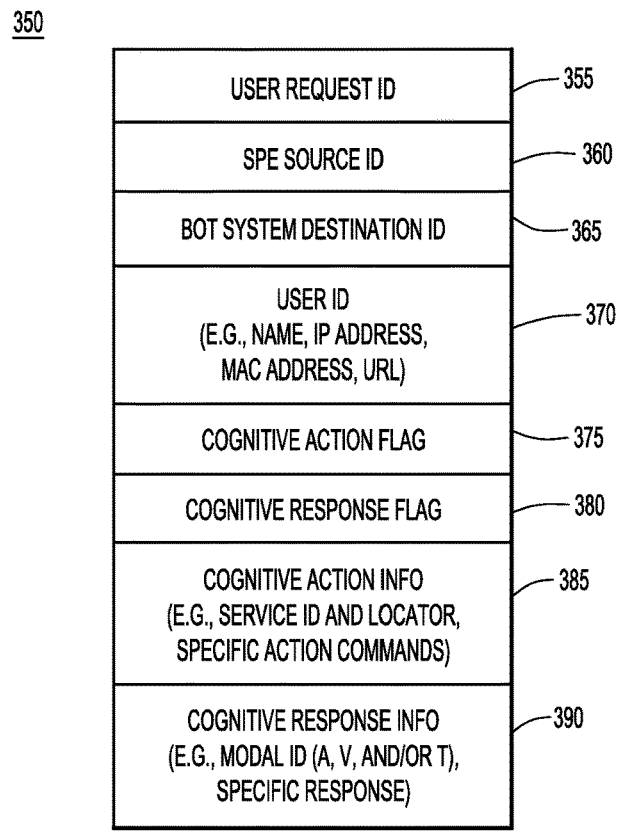
FIG. 3B is an illustration of a message format for an intent-based user request sent between various entities in the cognitive collaboration system, according to an example embodiment.

With reference to FIG. 3B, there is an illustration of an example message format 350 for user requests 254. In accordance with message format 350, a given user request 254 includes:

a. A user request identifier (ID) 355 identifying/indicating the user request to BOT subsystem (BS) 202;

b. A SPE source ID 360 that identifies the SPE and an entity/processing module within the SPE that is a source of the user request, such as an IP address, a media access control (MAC) address, name, geographical location, and/or other identifying information;

c. A BOT subsystem destination ID 365 that identifies the BOT subsystem and an entity, e.g., a specific BOT, within the BOT subsystem that is a destination of the user request, such as an IP address, a MAC address, name, geographical location, and/or other identifying information;

d. A user ID 370 that identifies the user and/or user device 102(i) associated with the user request (i.e., which is served by the user requests), such as an IP address, a MAC address, name, geographical location, and/or other identifying information;

e. A cognitive action flag 375 set to indicate whether the user request is for a cognitive action (i.e., for use by cognitive actions interpreter 210);

f. A cognitive response flag 380 set to indicate whether the user request is for a cognitive response (i.e., for use by cognitive responder 208). A given user request may be indicated as being for only a cognitive action or a cognitive response, or for both;

g. If the user request is for a cognitive action, cognitive action information 385 including a collaboration service ID (e.g., a URI/URL for the collaboration service, which may include an online meeting URL (such as a WebEx URL for a specific online meeting), a name of the collaboration service, and so on) and locator, as well as specific action commands to be sent in an action request to the identified collaboration service. Cognitive actions interpreter 210 generates/constructs the action request based on information 385; and h. If the user request is for a cognitive response, cognitive response information 390 identifying one or more modes (A, V, and/or T) for the response and including specific response information (e.g., identifying specific audio, video, and/or text for the response) to be sent in a user response to the identified/intended user device. Information 390 may also include identifying/destination information for the intended user/user device 102 (i), similar to field 370. Cognitive responder 208 generates/constructs the user response based on information 390.

Variations of the user request format 350 are possible. For example, one or more of the fields described above may be omitted and one or more fields may be added. Also, user requests intended for cognitive responder 208 and user requests intended for cognitive actions interpreter 210 may have different respective formats.

Several operational examples are now described. In a first example, a user associated with one of user devices 102 desires to start an online meeting and utters the voice command "start online meeting for John Doe." The user device captures the voice command and then transmits the voice command to stream receptor 206, which directs the voice command to stream processing engine 204. In stream processing engine 204, speech recognizer 230 and NLP 234 cooperate to derive a user intent "initiate online meeting for John Doe" corresponding to the voice command, and transmits the user intent as one or more of user requests 254 to Bot subsystem 202. In response, cognitive action interpreter 210 sends a "start online meeting command," along with an identity for the user "John Doe," to online meeting service 106c, which causes the online meeting service to initiate an online meeting, e.g., a WebEx meeting, with John Doe as the host.

In a second example, after the above-mentioned online meeting has begun, during the online meeting, the user desires to retrieve content, e.g., a document, from enterprise document management service (DMS) 106f. The user utters the voice command "retrieve document <document name> stored in folder <document folder> using <DMS>." The user device captures and then transmits the voice command to stream receptor 206, which directs the voice command to stream processing engine 204. Speech recognizer 230 and NLP 234 cooperate to derive a user intent "get document <document name>, folder <document folder>, <DMS>" corresponding to the voice command, and transmits the user intent as one or more of user requests 254 to Bot subsystem 202. In response, cognitive action interpreter 210 forwards the one or more user requests to DMS service 106f, which retrieves the document and returns it to cognitive responder 208. Cognitive responder 208 returns the document to the requesting user device. In a non-limiting example, cognitive action taker 210 may use Representational State Transfer (REST) web services (i.e., RESTful web services) to communicate with DMS service 106f. In that case, the RESTful web services may use Hypertext Transfer Protocol (HTTP) commands, such as GET, to retrieve the document.

In the second example, the voice command specifically identifies the source folder and the name of the document to be retrieved; however, stream processing engine 204 and cognitive actions interpreter 260 are able to respond to a more vague voice command that does not specifically identify the source folder and the name. In that case, stream processing engine derives an initial intent from the voice command and combines the initial intent with additional context clues accessible to the stream processing engine, e.g., that associate an identifier of the user to his/her organization and document databases within the organization, to infer an identity of the document to be retrieved and a location for retrieval.

In a third example, a user associated with one of user devices 102 desires to start an online meeting and utters the voice command "start online meeting," but does not indicate his or her name. The user device captures and then transmits the voice command to stream receptor 206, which directs the voice command to stream processing engine 204. Speech recognizer 230 and NLP 234 cooperate to derive an incomplete user intent "initiate online meeting for <unknown user>." Concurrent with these operations, the user device also captures video of the user and transmits the video to stream receptor 206, which directs the video to stream processing engine 204. Video object detector 232 detects a face of the user from the video, matches the face with a predetermined face in the face database of resources 105, and retrieves identifier information (e.g., "John Doe") for the user associated with the matched face. Stream processing engine 204 completes the user intent using the retrieved identifier information to produce a complete (i.e., completed) user intent "initiate online meeting for John Doe." In other words, stream processing engine 204 combines the concurrently processed voice command and detected face to produce the complete user intent. Stream processing engine 204 transmits the complete user intent as one or more of user requests 254 to Bot subsystem 202. In response, cognitive action interpreter 210 sends a "start online meeting command," along with an identity for the user "John Doe," to online meeting service 106c. Online meeting service 106c may return to cognitive action interpreter 210 a meeting URL generated by the online meeting service for joining the meeting. Cognitive action interpreter 210 may pass the meeting URL to cognitive responder 208, which in turn sends the meeting URL to the user device that was the source of the initial voice command for access by the user.

Expanding on the third example, stream processing engine 204, recognizing that the user intent was incomplete, generates a user request soliciting more information, e.g., "please give your user name," from the user, and sends that user request to Bot subsystem 202. In response, cognitive responder 208 generates a voice request in a voice response stream, and sends the voice response stream to the user device from which the voice command was initially received.

A fourth example involves conversation manager 212. Assume a user of one of the user devices utters a voice request RQ1 "what is the weather in London?" and receives via cognitive responder 208 a voice response RS1 "it's raining." At this time, conversation manager determines and stores "weather in London" together with an identifier for the user device as a context linking voice request RQ1 to voice response RS1. A short time later, the user utters another voice request RQ2 "what's the weather now?" CCS 204 already knows the context of voice request RQ1 as "weather in London" from conversation manager 212 and need not solicit more information from the user. Thus, CCS 204 simply responds with the appropriate voice response RS2 of weather description, e.g., "it's still raining." Linking voice requests to voice responses by a context sequence in conversation manager 212 is referred to as contextual communication.

Figure 4:
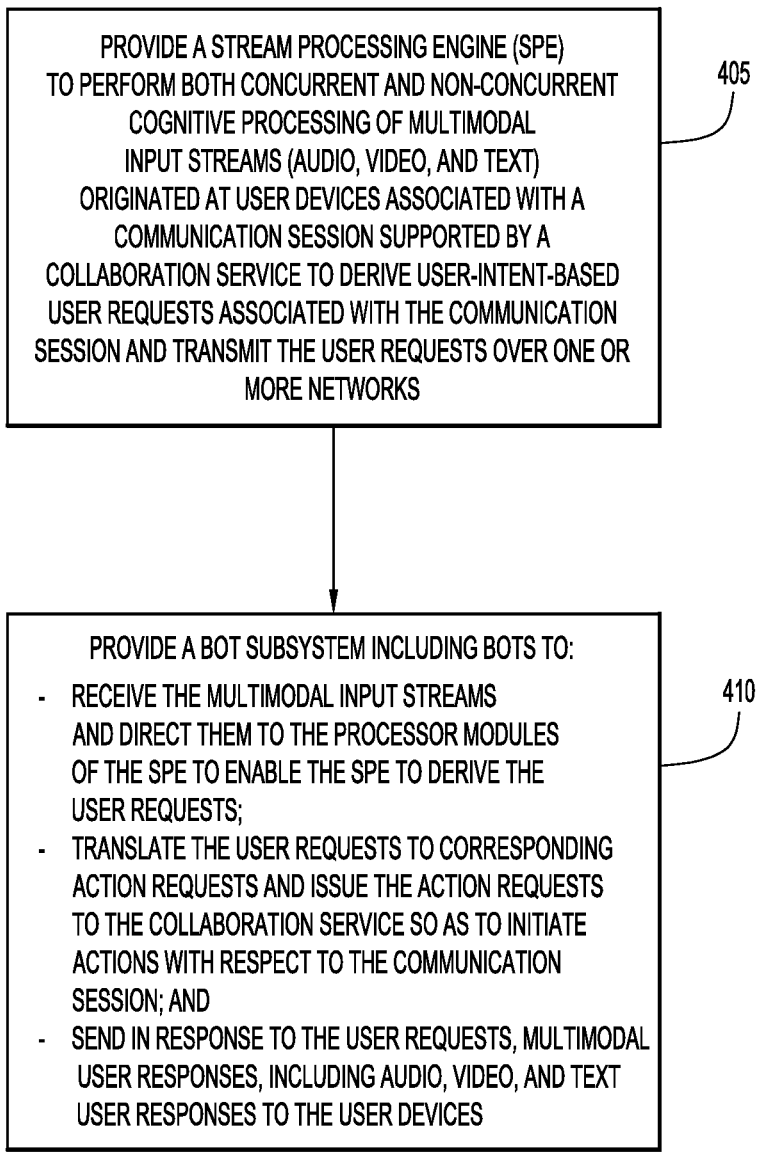
FIG. 4 is a flowchart of a high-level method of performing multimodal stream processing-based cognitive collaboration, according to an example embodiment.

With reference to FIG. 4 there is a flowchart of an example high-level method 400 of performing multimodal stream processing-based cognitive collaboration using CCS 104.

At 405, stream processing engine 204 is provided. Stream processing engine 204 includes a plurality of processor modules configured to perform cognitive processing of multimodal input streams 254 including input audio, input video, and input text, originated at one or more of user devices 102 associated with a communication session supported by one of collaboration services 106. The cognitive processing derives user-intent-based user requests 254 associated with the communication session. Stream processing engine 204 transmits user requests 254 over network 108.

At 410, Bot subsystem 202 is provided. Bot subsystem communicates with stream processing engine 204, the one of collaboration services 106, and the one or more of user devices 102 over network 108. Bot subsystem 202 includes a collection of Bots. The collection of Bots includes stream receptor 206 to receive multimodal input streams 250 from the one or more of user devices 102 and direct the multimodal input streams to an appropriate ones of the plurality of processor modules (e.g., stream processor 220) of stream processing engine 204 to enable the stream processing engine to derive user requests 254. In addition, stream receptor may receive, and then forward to stream processing engine 204, various information (i.e., identifiers) identifying users and/or user devices 102 originating multimodal input streams 250, such that stream processing engine 204 may then associate a source of multimodal content with user intent derived from that content by the stream processing engine.

The collection of Bots also includes cognitive action interpreter 210 to translate user requests 254 to corresponding action requests and issue the action requests (260) to the one of the collaboration services 106 so as to initiate actions with respect to the communication session.

The collection of Bots also includes cognitive responder 208 to transmit, in response to at least some of user requests 254, multimodal user responses 258, including audio, video, and text user responses to the one or more of user devices 102.

Figure 5:
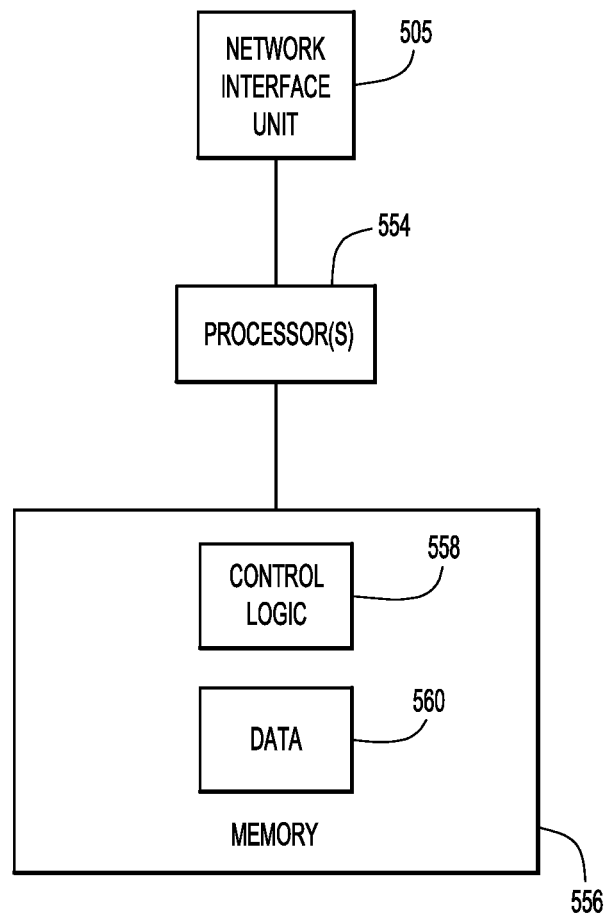
FIG. 5 is a block diagram of a computer system to host one or more Bots of a Bot subsystem of the cognitive collaboration system or one or more cognitive processing modules of the stream processing engine of the cognitive collaboration system, according to an example embodiment.

With reference to FIG. 5, there is a block diagram of an example computer device 500 for hosting one or more Bots of Bot subsystem 202 or one or more cognitive processing modules of stream processing engine 204. Thus, computer device 500 may represent a server on which Bot subsystem 202 is implemented or a server on which stream processing engine 204 is implemented. Computer device 500 includes network interface unit 505 to communicate with a wired and/or wireless communication network. Computer device 500 also includes a processor 554 (or multiple processors, which may be implemented as software or hardware processors), and memory 556. Network interface unit 505 may include an Ethernet card with a port (or multiple such devices) to communicate over wired Ethernet links and/or a wireless communication card with a wireless transceiver to communicate over wireless links.

Memory 556 stores instructions for implementing methods described herein. Memory 556 may include read only memory (ROM), random access memory (RAM), magnetic disk storage media devices, optical storage media devices, flash memory devices, electrical, optical, or other physical/tangible (non-transitory) memory storage devices. The processor 554 is, for example, a microprocessor or a microcontroller that executes instructions stored in memory. Thus, in general, the memory 556 may comprise one or more tangible computer readable storage media (e.g., a memory device) encoded with software comprising computer executable instructions and when the software is executed (by the processor 554) it is operable to perform the operations described herein. Memory 556 stores control logic 558 to perform operations of Bots in Bot Subsystem 202 or cognitive processing modules of stream processing engine 204 described herein. The memory 556 may also store data 560 used and generated by logic 558.

Figure 6:
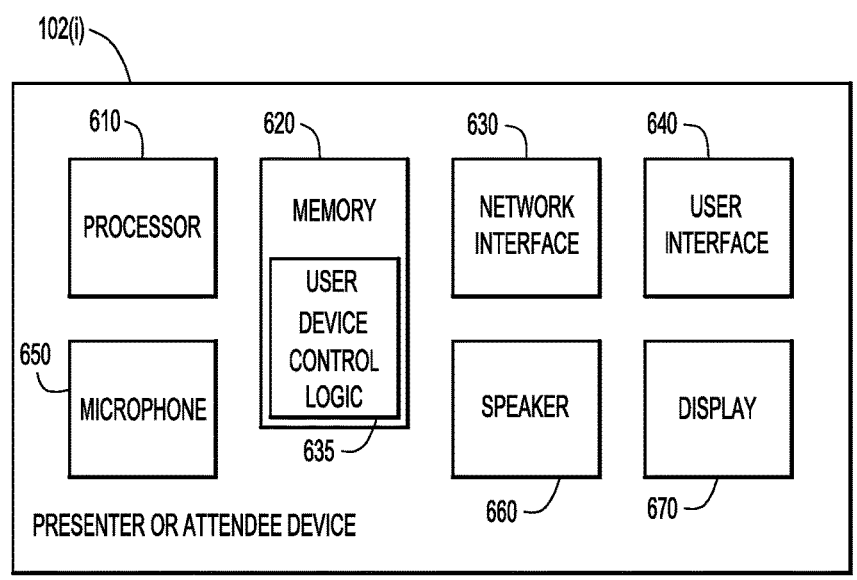
FIG. 6 is a block diagram of a user device, according to an embodiment.

Referring now to FIG. 6, a block diagram of a user device 102(i) is shown, according to an embodiment. The user device 102(i) includes a processor 610 to process instructions, memory 620 to store a variety of data and software instructions. The processor 610 is, for example, a microprocessor or microcontroller that executes instructions of user device control logic 635 in memory 620 for implementing the processes described herein. The user device 102(i) also includes a network interface unit (e.g., card) 630 to communicate with other devices over network 108. Network interface unit 630 may include an Ethernet card with a port (or multiple such devices) to communicate over wired Ethernet links and/or a wireless communication card with a wireless transceiver to communicate over wireless links.

User device 102(i) may further include a user interface unit 640 to receive input from a user, microphone 650 and speaker 660. The user interface unit 640 may be in the form of a keyboard, mouse and/or a touchscreen user interface to allow for a user to interface with the user device 102(i). Microphone 650 and speaker 660 enable audio to be recorded and output. User device 102(*i*) may also comprise a display 670, including, e.g., a touchscreen display, that can display data to a user.

Memory 620 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 620 may comprise one or more tangible (non-transitory) computer readable storage media (e.g., a memory device) encoded with software (e.g., user device control logic/software 635) comprising computer executable instructions and when the software is executed (by the processor 610) it is operable to perform the operations described herein. Logic 635 includes instructions to generate and display graphical user interfaces to present information on display 670 and allow a user to provide input to the user device 102(*i*) through, e.g., user selectable options of the graphical user interface. Memory 620 also stores data generated and used by user device control logic 635.

In summary, in one aspect, a system is provided comprising: a stream processing engine including a plurality of processor modules configured to perform cognitive processing of multimodal input streams including input audio, input video, and input text, originated at one or more user devices associated with a communication session supported by a collaboration service to derive user-intent-based user requests associated with the communication session and transmit the user requests over one or more networks; and a Bot subsystem configured to communicate with the stream processing engine, the collaboration service, and the one or more user devices over the one or more networks, the Bot subsystem including a collection of Bots configured to implement: a stream receptor to receive the multimodal input streams from the one or more user devices and direct the multimodal input streams to an appropriate one or ones of the plurality of processor modules of the stream processing engine to enable the stream processing engine to derive the user requests; a cognitive action interpreter to translate the user requests to corresponding action requests and issue the action requests to the collaboration service so as to initiate actions with respect to the communication session; and a cognitive responder to transmit, in response to the user requests, multimodal user responses, including audio, video, and text user responses to the one or more user devices.

In another aspect, a method is provided comprising: at a plurality of processor modules of a stream processing engine, performing cognitive processing of multimodal input streams including input audio, input video, and input text, originated at one or more user devices associated with a communication session supported by a collaboration service, wherein the performing cognitive processing includes deriving user-intent-based user requests associated with the communication session and transmit the user requests over one or more networks; and at a Bot subsystem configured to communicate with the stream processing engine, the collaboration service, and the one or more user devices over the one or more networks, the Bot subsystem including a collection of Bots: receiving the multimodal input streams from the one or more user devices and directing the multimodal input streams to an appropriate one or ones of the plurality of processor modules of the stream processing engine to enable the stream processing engine to derive the user requests; translating the user requests to corresponding action requests and issuing the action requests to the collaboration service so as to initiate actions with respect to the communication session; and transmitting, in response to the user requests, multimodal user responses, including audio, video, and text user responses to the one or more user devices.

In yet another aspect, non-transitory processor readable media storing instructions are provided. The instructions, when executed by a processor, cause the processor to: implement a stream processing engine including a plurality of processor modules, the instructions to cause the processor to implement the stream processing engine including instructions to cause the processor to perform cognitive processing of multimodal input streams including input audio, input video, and input text, originated at one or more user devices associated with a communication session supported by a collaboration service to derive user-intent-based user requests associated with the communication session and transmit the user requests; and implement a collection of Bots of a Bot subsystem configured to communicate with the stream processing engine, the collaboration service, and the one or more user devices, the instructions to cause the processor to implement the collection of Bots including instructions to cause the processor to: receive the multimodal input streams from the one or more user devices and direct the multimodal input streams to an appropriate one or ones of the plurality of processor modules of the stream processing engine to enable the stream processing engine to derive the user requests; translate the user requests to corresponding action requests and issue the action requests to the collaboration service so as to initiate actions with respect to the communication session; and transmit, in response to the user requests, multimodal user responses, including audio, video, and text user responses to the one or more user devices.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A system comprising:
   a stream processing engine including a plurality of processor modules configured to perform cognitive processing of multimodal input streams including input audio, input video, and input text, originated at one or more user devices associated with a communication session supported by a collaboration service, wherein the plurality of processor modules includes a speech-to-text module to convert speech in the input audio to converted text, and a natural language processor to derive user intent from the input text and the converted text is available, and wherein the stream processing engine is further configured to derive user requests associated with the communication session based on the user intent and to transmit the user requests over one or more networks; and
   a Bot subsystem configured to communicate with the stream processing engine, the collaboration service, and the one or more user devices over the one or more networks, the Bot subsystem including a collection of Bots configured as computer programs that run automated tasks over the one or more networks to implement:
   a stream receptor to receive the multimodal input streams from the one or more user devices and direct the multimodal input streams to an appropriate one or ones of the plurality of processor modules of the stream processing engine to enable the stream processing engine to derive the user requests;
a cognitive action interpreter to translate the user requests to corresponding action requests and issue the action requests to the collaboration service so as to initiate actions with respect to the communication session; and
a cognitive responder to transmit, in response to the user requests, multimodal user responses, including audio, video, and text user responses to the one or more user devices.

2. The system of claim 1, wherein the plurality of processor modules of the stream processing engine further include:
an entity extractor to access, based on the user intent from the natural language processor, information associated with the communication session and the collaboration service,
wherein the stream processing engine is further configured to derive the user request based on the user intent and the information accessed by the entity extractor.

3. The system of claim 1, wherein the plurality of processor modules of the stream processing engine further include:
a knowledge graph module to generate a knowledge graph associated with the user intent to resolve the user intent based on first information associated with the collaboration service if the user intent from the natural language processor is incomplete; and
a disambiguator to disambiguate the user intent based on second information associated with the collaboration service if the user intent from the natural language processor would otherwise result in multiple ambiguous user requests.

4. The system of claim 1, wherein the plurality of processor modules of the stream processing engine further include:
an object recognition module to detect faces in the input video and determine whether the faces that are detected are known based on a database of faces associated with the collaboration service,
wherein the stream processing engine is configured to perform the cognitive processing to derive the user requests based on the user intent and the detected faces that are determined to be recognized.

5. The system of claim 1, wherein the stream processing engine and the cognitive responder cooperate to convert speech requests in the input audio to speech responses, and the Bot subsystem further includes a conversation manager to determine a contextual conversation sequence associated with the communication session and classify as the contextual conversation sequence a sequence including at least some of the speech requests and at least some of the speech responses that share the same conversation context.

6. The system of claim 1, wherein the processor modules of the stream processing engine further include a machine learning module configured to receive the user requests and learn rules with which to derive the user requests.

7. The system of claim 1, wherein:
the stream processing engine is configured to identify for each user request a mode of the multimodal input stream, as audio, video, or text, from which the user request was primarily derived and transmit to the cognitive responder an indication of the mode with the user request; and
the cognitive responder is configured to transmit the user response in response to the user request using audio, video, or text using the mode indicated in the user request.

8. The system of claim 1, wherein:
the communication session is a video conference session and the collaboration service is a video conference service;
the stream processing engine is configured to derive from one of the multimodal input streams one of the user requests as a start video conference request; and
the cognitive action interpreter is configured to translate the start video conference request to a corresponding action request that is able to be understood by the video conference service and transmit the request to the video conference service so as to cause the video conference service to start the video conference session.

9. The system of claim 1, wherein:
the communication session is a document retrieval session and the collaboration service is a document management system;
the stream processing engine is configured to derive from one of the multimodal input streams one of the user requests as a document retrieval request identifying a specific document to be retrieved; and
the cognitive action interpreter is configured to translate the document retrieval request to a corresponding action request that is able to be understood by the document management system and transmit the action request to the documentation management system so as to cause the document management system to retrieve the specific document.

10. The system of claim 1, wherein:
the communication session is a web-based meeting in a personal meeting room (PMR) and the collaboration service is a web-based meeting service;
the stream processing engine is configured to derive from one of the multimodal input streams one of the user requests as a request to start the web-based meeting; and
the cognitive action interpreter is configured to translate the request to a corresponding action request that is able to be understood by the web-based meeting service and transmit the action request to the web-based meeting service so as to cause the web-based meeting service to start the web-based meeting.

11. The system of claim 1, wherein each of the user requests includes:
a source identifier for the stream processing engine, a destination identifier for the Bot subsystem, an identifier of one of the one or more user devices serviced by the user request, information for a user response or information for an action request.

12. A method comprising:
at a plurality of processor modules of a stream processing engine, performing cognitive processing of multimodal input streams including input audio, input video, and input text, originated at one or more user devices associated with a communication session supported by a collaboration service, wherein the performing cognitive processing includes converting speech in the input audio to converted text, deriving user intent from the input text and the converted text is available, deriving user requests associated with the communication session based on the user intent, and transmitting the user requests over one or more networks; and at a Bot subsystem configured to communicate with the stream processing engine, the collaboration service, and the one or more user devices over the one or more networks, the Bot subsystem including a collection of Bots configured as computer programs that run automated tasks over the one or more networks:
  receiving the multimodal input streams from the one or more user devices and directing the multimodal input streams to an appropriate one or ones of the plurality of processor modules of the stream processing engine to enable the stream processing engine to derive the user requests;
  translating the user requests to corresponding action requests and issuing the action requests to the collaboration service so as to initiate actions with respect to the communication session; and
  transmitting, in response to the user requests, multimodal user responses, including audio, video, and text user responses to the one or more user devices.

13. The method of claim 12, further comprising, at the stream processing engine:
  accessing, based on the user intent, information associated with the communication session and the collaboration service,
  wherein the deriving the user requests further includes deriving the user requests based on the user intent and the accessed information.

14. The method of claim 12, further comprising, at the stream processing engine:
  detecting faces in the input video and determine whether the faces that are detected are known based on a database of faces associated with the collaboration service,
  wherein the deriving the user requests further includes deriving the user requests based on the user intent and the detected faces that are determined to be recognized.

15. The method of claim 12, further comprising:
  at the stream processing engine, identifying for each user request a mode of the multimodal input stream, as audio, video, or text, from which the user request was primarily derived and transmitting to the cognitive responder an indication of the mode via the user request; and
  at the cognitive responder, transmitting the user response in response to the user request using audio, video, or text using the mode indicated in the user request.

16. One or more non-transitory processor readable media storing instructions that, when executed by a processor, cause the processor to:
  implement a stream processing engine including a plurality of processor modules, the instructions to cause the processor to implement the stream processing engine including instructions to cause the processor to perform cognitive processing of multimodal input streams including input audio, input video, and input text, originated at one or more user devices associated with a communication session supported by a collaboration service, wherein the instructions to cause the processor to implement the stream processing engine include instructions to cause the processor to convert speech in the input audio to converted text, derive user intent from the input text and the converted text is available, derive user requests associated with the communication session based on the user intent, and transmit the user requests; and
  implement a collection of Bots of a Bot subsystem configured to communicate with the stream processing engine, the collaboration service, and the one or more user devices, the instructions to cause the processor to implement the collection of Bots configured as computer programs that run automated tasks over the one or more networks, including instructions to cause the processor to:
    receive the multimodal input streams from the one or more user devices and direct the multimodal input streams to an appropriate one or ones of the plurality of processor modules of the stream processing engine to enable the stream processing engine to derive the user requests;
    translate the user requests to corresponding action requests and issue the action requests to the collaboration service so as to initiate actions with respect to the communication session; and
    transmit, in response to the user requests, multimodal user responses, including audio, video, and text user responses to the one or more user devices.

17. The non-transitory processor readable media of claim 16, wherein the instructions to cause the processor to implement the stream processing engine include further instructions to cause the processor to:
  access, based on the user intent, information associated with the communication session and the collaboration service; and
  derive the user requests based on the user intent and the accessed information.

18. The method of claim 12, wherein the processor modules of the stream processing engine further include a machine learning module configured to receive the user requests and learn rules with which to derive the user requests.

19. The non-transitory processor readable media of claim 16, further comprising instructions to implement a machine learning module of the stream processing engine configured to receive the user requests and learn rules with which to derive the user requests.

20. The non-transitory processor readable media of claim 16, wherein the instructions to implement the stream processing engine include instructions to cause the processor to:
  detect faces in the input video and determine whether the faces that are detected are known based on a database of faces associated with the collaboration service,
  wherein the instructions to cause the processor to derive the user requests further include instructions to cause the processor to derive the user requests based on the user intent and the detected faces that are determined to be known.

* * * * *